June 18, 1957 C. K. FOCHT 2,796,075
OIL PRESSURE CONTROL VALVE
Filed Feb. 26, 1954 2 Sheets-Sheet 1
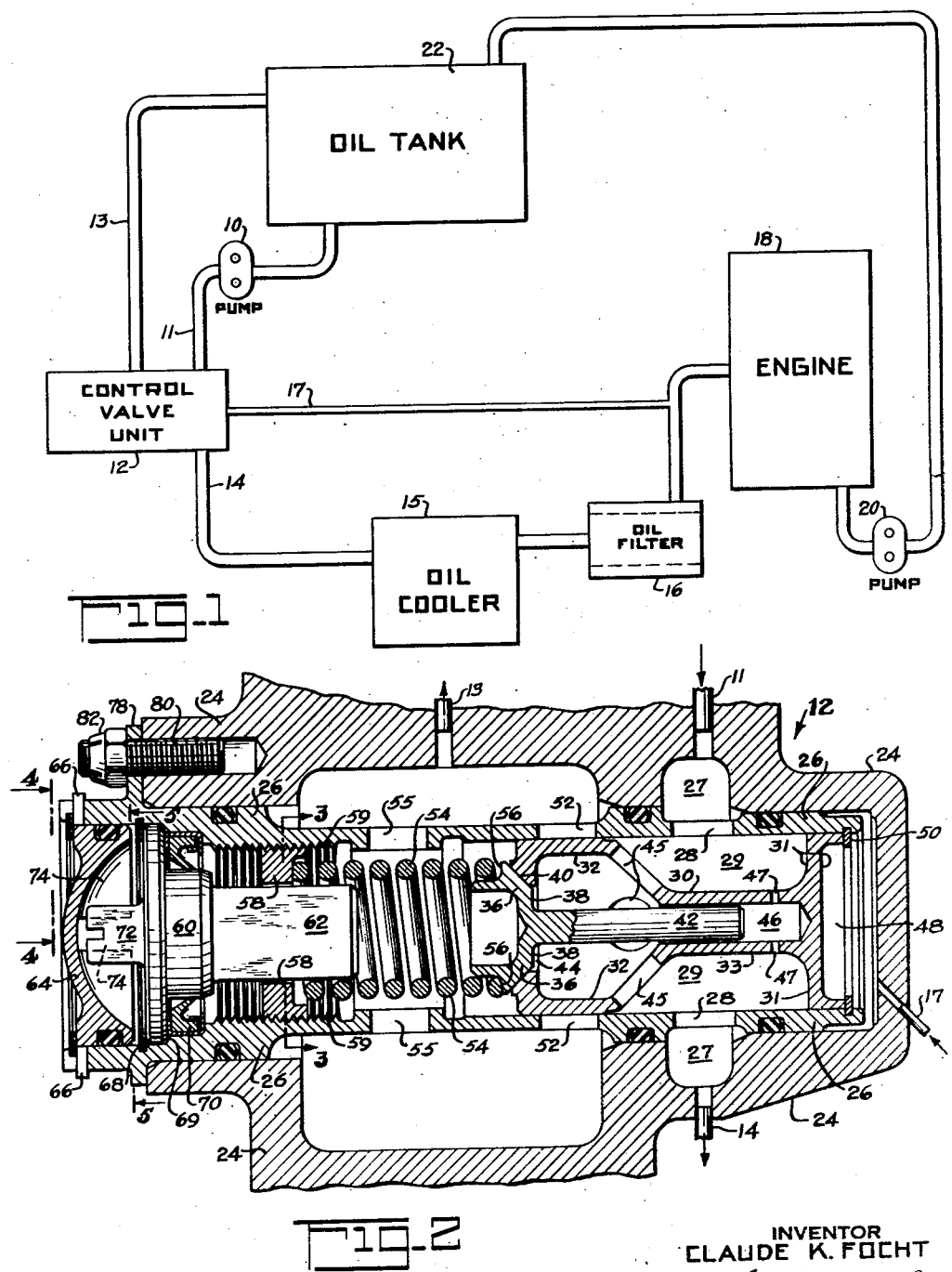
INVENTOR
CLAUDE K. FOCHT
BY
ATTORNEY June 18, 1957 C. K. FOCHT 2,796,075
OIL PRESSURE CONTROL VALVE
Filed Feb. 26, 1954 2 Sheets-Sheet 2
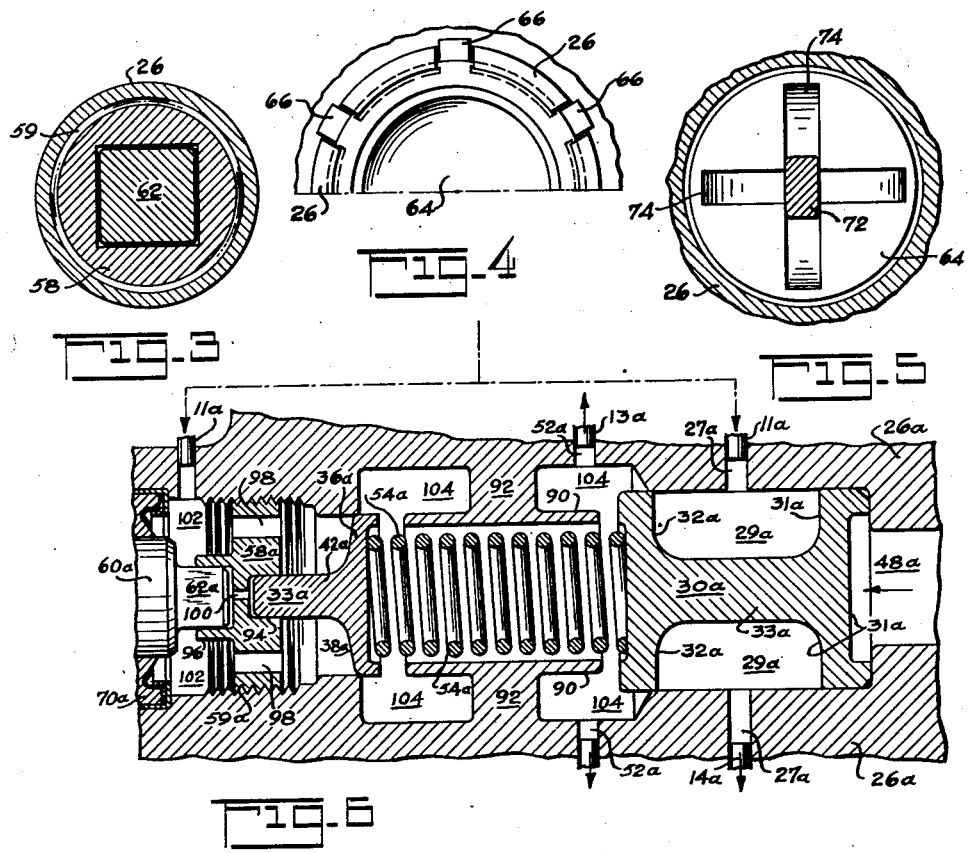
INVENTOR
CLAUDE K. FOCHT
BY
ATTORNEY United States Patent Office 2,796,075
Patented June 18, 1957

2,796,075

OIL PRESSURE CONTROL VALVE

Claude K. Focht, Rochelle Park, N. J., assignor to Curtiss-Wright Corporation, a corporation of Delaware Application February 26, 1954, Serial No. 412,751

6 Claims. (Cl. 137—108)

This invention relates to a fluid pressure system for a mechanism, and more particularly to an oil pressure lubrication system for combustion engines. For an example of a prior art oil pressure lubrication system attention is directed to Patent No. 2,298,646 to Ovens.

In the usual (forced) pressure lubrication system for a combustion engine there is a remote point where it is desired to maintain a particular pressure, this pressure as a matter of course, being somewhat lower than that at the main pump outlet. This remote point is in the engine itself, and, if a pressure relief valve is set to by-pass oil when the engine oil pressure exceeds a predetermined desired engine oil pressure, it becomes clear that other points in the system nearer the pump outlet are not protected from the effects of excessive pressure so long as the pressure in the engine does not exceed the prescribed value. To be more specific, suppose that, in starting up the engine, the lubricating oil may be cold or that there may be a restriction in the oil line somewhere before the engine such that no oil will flow into the engine. Obviously there will be no excessive oil pressure exerted on the standard relief valve; the valve will not move to the open position; oil will continue to flow into the lines. Thus, the oil pressure at the main oil pump discharge will continue to increase to the point where material damage may occur.

The object of this invention is to provide a pressure relief valve at the pump outlet which will by-pass oil when the fluid pressure at the engine exceeds a certain desired value; and, at the same time, with no additional springs or housings, provide a pressure relief valve which will be sensitive to pressures existent in the oil lines at the pump outlet so as to relieve the pump outlet pressure when said pressure tends to exceed a predetermined high value.

Another object of this invention is to permit adjustment of the compression of the spring which urges both valves towards a closed position through a single means readily accessible at all times.

Further objects of this invention will be appreciated in reading the detailed description below in connection with the drawing in which:

Figure 1 is a schematic view of the engine pressure lubricating system and the relationship of the invention thereto;

Figure 2 is a longitudinal section through the control valve unit of the invention;

Figure 3 is a section taken along line 3—3 of Figure 2;

Figure 4 is a partial end view taken along line 4—4 of Figure 2;

Figure 5 is a sectional view taken along line 5—5 of Figure 2; and

Figure 6 is a view similar to Figure 2 but illustrating a modified construction.

Referring briefly to Figure 1, 10 indicates a conventional engine oil pump such as is used on aircraft combustion engines to pump lubricating fluid to the interior sections of the engine, 11 is a conduit from said pump to 12, a valve unit for controlling the lubricating oil pressure in the system, said valve being situated at the discharge of the main engine oil pump 10. If desired, as is conventional a suitable means for cooling oil may be provided as schematically shown in 15, said means being operatively connected to valve unit 12 by conduit 14. The cooler may comprise, for example, an air to oil heat exchanger and an oil to fuel heat exchanger. In addition, the oil flows through an engine oil filter 16, thence through engine components shown diagrammatically as 18, thence through a main oil line return pump (scavenge pump) 20 to an oil tank 22 from whence the process is repeated. 17 is a conduit connecting valve unit 12 to the inlet of the engine 18. Excessive pressure at the engine 18 acts through the conduit 17 on the valve unit 12 to cause oil to flow from the conduit 11 to the valve unit 12 and back through a return line 13 into the oil tank 22.

Figures 2–5 show the control valve unit 12 in greater detail. This unit comprises a housing 24 into which a sleeve 26 is inserted. An annulus 27 in the housing 24 communicates through a plurality of radial holes 28 in the sleeve 26 with a cavity 29 in said sleeve 26. Within this cavity 29 a sliding valve 30 is contained, said sliding valve 30 having two spaced portions 31 and 32 connected by a stem 33 with the pump oil pressure communicating through the sleeve 26 into the sleeve cavity 29 so as to balance the forces on said spaced portions 31 and 32 rendering said valve 30 unaffected by the main oil pump discharge pressure. A poppet valve 36 having a rear face 38 is seated in a valve seat 40 in the spaced portion 32, the stem 42 of said poppet valve 36 passing through a hole 44 in the spaced portion 32 and a cavity 46 in the stem 33 of the sliding valve 30. The pump oil pressure acts through the cavity 29 and a plurality of oil holes 45 in the spaced portion 32 of the sliding valve 30 and thence on the rear face 38 of said poppet valve 36. To permit the poppet valve 36 to move towards the right end of valve unit 12, with the stem 42 sliding inside of the cavity 46, oil relief holes 47 are drilled in the stem 33 of the valve 30 so that oil can flow from the cavity 46 into the cavity 29. The sliding valve 30 is moved to the left by oil pressure exerted operatively through conduit 17 on said sliding valve through the cavity 48 formed by the housing 24, the spaced portion 31 of the sliding valve 30 and the sleeve 26. Movement of the sliding valve 30 to the right is limited by an internal snap ring 50. Movement of the sliding valve 30 towards the left uncovers a plurality of radial holes 52 in the sleeve 26. The poppet valve 36, and through it the sliding valve 30, is loaded by means of a spring 54 seated on a shoulder 56 of the poppet valve 36 and carried within the sleeve 26 having a plurality of radial holes 55 spaced circumferentially about said sleeve at this point. The initial compression of the loading spring 54 is determined by an adjusting nut 58 screwed into a threaded portion 59 of the sleeve 26 by means of an adjusting nut wrench 60 having a non-circular or splined shank 62 concentric with the adjusting nut 58. As shown in Figs. 2 and 3 of the drawing, the shank 62 has a square cross-section thereby restraining any rotational movement of the wrench 60 relative to the nut 58. The nut 58 through the wrench 60 is constrained from rotative movement by the splined locking plate 64 having a plurality of splines or tabs 66 intermeshing with the sleeve 26. Rotation of the wrench 60 and nut 58 is restrained by a locking mechanism indicated in more detail in Figure 5 whereby a wrench head 72 is seated in one of four possible positions in the roof of the locking plate 64, said head being seated in a groove 74 in said locking plate roof. The wrench 60 is held in axial position against the sleeve shoulder 69 by a ring 68 which is received in a groove in the sleeve 26. A seal against oil leakage around the wrench 60 and through the splined locking plate 64 is provided by an elastic spacer seal 70. Finally, the sleeve 26 is secured to the housing 24 on the left end by means of an eccentric flange 78, and a plurality of studs 80 and self-locking nuts 82.

Briefly, the operation of the system so far described is as follows:

Lubricating oil from the oil tank 22 is pumped by the main oil pump 10 through the conduit 11 into annulus 27 in the housing 24, thence into a conduit 14, through the oil cooler 15, the oil filter 16, and the engine 18. The oil pressure at the engine 18 is transmitted through the conduit 17 into the cavity 48 where it acts on the rear face of the spaced portion 31 of the sliding valve 30. If the engine inlet oil pressure becomes excessive, the sliding valve 30 will be moved towards the left uncovering a plurality of radial oil holes 52. The oil flowing into the annulus 27 normally will flow out through the conduit 14. However, after the valve 30 has moved as described, some of the oil will flow from said annulus 27 through the said holes 52 into the conduit 13 and back to the oil tank 22 thus effectively providing a by-pass circuit for the oil around the normal circuit thereby relieving the excessive oil pressure built up at the engine inlet 18.

However, in the case of a restriction before or after the oil cooler 15, or somewhere before the conduit 17, it would be possible for high oil pressures to be built up without causing the sliding relief valve 30 to move since, because of the restriction, there would be little or no oil pressure acting on the rear face of the spaced portion 31 of the sliding valve 30. This could happen at starting if the oil were cold or had foreign elements suspended or accumulated therein. To prevent damage to the main oil pump 10, the valve unit 12, or the oil cooler 15 etc. in such a case, the poppet valve 36 is incorporated in said valve unit 12. If the oil pressure becomes excessive in conduit 14 or annulus 27 or conduit 11 etc., this high pressure is transmitted through the plurality of holes 45 in the spaced portion 32 to the rear face 38 of the poppet valve 36. Said poppet valve 36 will then move to the left permitting the oil to flow through a hole in the spaced portion 32 around the spring 54 out of the plurality of radially spaced holes 55 in the sleeve 26 and thence through the conduit 13 back to the oil tank 22 again providing an effective by-pass system to relieve the excessive pressures present in the main system. The oil holes 47 are located in the stem 33 of sliding valve 30 to permit scavenging of oil present in cavity 46 when the poppet valve 36 is returning to its original position after relieving the excess oil pressure.

In Figure 6, an alternate construction of the valve unit 12, components serving the same purpose as those described in Figure 2 have been assigned the same reference number but with the subscript *a* added. A sleeve 26a carries a sliding valve 30a, a spring 54a, a poppet valve 36a, an adjusting nut 58a, and an adjusting nut wrench 60a. Engine oil pressure in a cavity 48a acting on a spaced portion 31a of the sliding valve 30a urges said valve towards an open position. Oil from the main oil pump flowing through a conduit 11a and an oil hole 27a in the sleeve 26a into the cavity 29a acts on a spaced portion 32a and the spaced portion 31a of the sliding valve 30a. Said spaced portions 31a and 32 are connected by a valve stem 33a. The pressures on each of said portions balance each other and the sliding valve 30a, thus balanced, is not urged in either direction by the main oil pump pressure. Said valve is sensitive to engine oil pressure alone. Oil normally flows from the conduit 11a into the cavity 29a thence to the conduit 14a and into the engine. The spring 54a is seated on the valve 30a and is operatively connected to the poppet valve 36a through sleeve guides 90 supported by a plurality of struts 92. The spring 54a is also seated on poppet valve 36a. The stem 33a of said poppet valve sits in a countersunk hole 94 in nut 58a. A boss 96 in nut 58a contains the square shank 62a of the wrench 60a.

Nut 58a also contains a plurality of oil holes 98 and an oil relief hole 100 extending through said nut from the bottom of boss 96 to the bottom of countersunk hole 94. Movement of the poppet valve 36a towards the closed position can be accomplished since oil in the countersunk hole 94 will be forced back out through the relief hole 100 into a main cavity 102. Oil from the main pump flows from the conduit 11a into the main cavity 102, thence through the plurality of holes 98 in the nut 58a and act on the head of the poppet valve 36a urging said valve towards an opening position. When the poppet valve 36a is open oil flows into a cavity 104 in sleeve 26a, around the plurality of studs 92 and out through the plurality of holes 52a. Thus, pump pressure is relieved in the same manner as that described with respect to the operation of the valve unit 12 shown in Figure 2.

Some of the advantages of the type of system described may be set out as follows: Either control valve design shown herein permits operation of two valves, both loaded by a common spring. Thus in this one unit, two pressure sensitive devices may be incorporated. The oil pressures which will cause the two valves to open or close may be of different magnitudes even though the said two valves have been loaded with a single spring. This result can be accomplished simply by varying the areas of the faces of the valves being subjected to the oil pressure. Thus if a given force or loading is applied to the spring and if the pressure area of the sliding valve is 2A while the pressure area of the poppet valve is A, then the pressure which will cause the poppet valve to open will be twice as great as that causing the sliding valve to open. Obviously there are an infinite number of combinations of pressure areas which can be selected.

In addition to those objects and advantages already set forth the following should be noted: Both pressures may be set by adjusting the single mechanism acting on the single spring. This adjustment may be made by a simple setting of the adjustment mechanism and can be done very easily with the removal of one or two cover plate parts. Furthermore, varying the two valve area ratios in the system will allow different ratios of maximum pressures permissible in the different sections of the system.

While I have described my invention in its present preferred embodiments, it will be obvious to those skilled in the art, after understanding my invention, that various changes and modifications may be made therein without departing from the spirit or scope thereof. I aim in the appended claims to cover all such modifications and changes.

I claim as my invention:

1. A pressure relief valve mechanism for use with a system including a pump; said mechanism comprising a first valve arranged to move to an open position to relieve pump output pressure and a second valve movable relative to said first valve to an open position also to relieve said pressure; elastic means common to both said valves for urging said valves in a closing direction; means for subjecting a surface of the first valve to a fluid pressure responsive to the pressure at a system first point for moving said first valve to an open position against said elastic means when the fluid pressure at said first point exceeds a predetermined value; and means for subjecting a surface of the second valve to a fluid pressure at a system second point for moving said second valve relative to said first valve to an open position against said elastic means when the pressure at said second point exceeds a different predetermined value.

2. A pressure relief valve mechanism as recited in claim 1 in which the effective area of said first valve surface to the fluid pressure at said first point is larger than the effective area of said second valve surface to the fluid pressure at said second point.

3. A fluid pressure relief valve mechanism for use with a system including a fluid pump; said mechanism comprising a first valve having spaced portions with the space between said portions being subjected to pump supply pressure, said valve being movable in an opening direction to relieve said pump supply pressure; means for subjecting a surface of one of said two spaced valve portions to the fluid pressure in said system at a point downstream of said pump supply pressure for urging said valve in an opening direction; a second valve movable with and relative to said first valve, said second valve being cooperable with a passage in the other of said spaced portions of said first valve such that said second valve is movable in a direction relative to said first valve to open said passage and relieve said pump supply pressure, said second valve having a surface subjected to the fluid pressure in said space for urging said second valve relative to said first valve in said passage opening direction and the effective area of said second valve surface to the pressure acting thereon being less than the effective area of said first valve surface to said downstream pressure; and a spring for urging both said valves in a closing direction.

4. A fluid pressure relief mechanism as recited in claim 3 including means movable for adjusting the force exerted by said spring on said valves.

5. A fluid pressure relief valve mechanism for use with a system including a fluid pump; said mechanism comprising a first valve arranged to move to an open position to relieve pump output pressure and a second valve movable relative to said first valve to an open position also to relieve said pressure; elastic means common to both said valves for urging said valves in a closing direction; means for subjecting a surface of the first valve to a first fluid pressure for moving said first valve to an open position against said elastic means when said first fluid pressure exceeds a predetermined value; and means for subjecting a surface of the second valve to a second fluid pressure for moving said second valve relative to said first valve to an open position against said elastic means when said second pressure exceeds a different predetermined value.

6. A fluid pressure relief valve mechanism as recited in claim 5 in which the effective area of said first valve surface to said first fluid pressure is larger than the effective area of the second valve surface to said second fluid pressure.

References Cited in the file of this patent

UNITED STATES PATENTS

| 2,440,883 | Wiegman | May 4, 1948 |
| 2,655,930 | Towler et al. | Oct. 20, 1953 |

FOREIGN PATENTS

| 3,647 of 1913 | Great Britain | Apr. 24, 1913 |